United States Patent
Poirier

(10) Patent No.: US 9,223,532 B1
(45) Date of Patent: Dec. 29, 2015

(54) DEVICES, SYSTEMS, AND METHODS FOR COMMUNICATING WITH AN IMAGE-FORMING DEVICE

(71) Applicant: CANON KABUSHIKI KAISHA, Tokyo (JP)

(72) Inventor: Peter Poirier, Woodinville, WA (US)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/523,628

(22) Filed: Oct. 24, 2014

(51) Int. Cl.
*G06F 15/00* (2006.01)
*G06F 3/12* (2006.01)

(52) U.S. Cl.
CPC ............ *G06F 3/1292* (2013.01); *G06F 3/1209* (2013.01); *G06F 3/1236* (2013.01); *G06F 3/1268* (2013.01)

(58) Field of Classification Search
CPC .... G06F 3/1292; G06F 3/1209; G06F 3/1268
USPC ........................................................ 358/1.14
See application file for complete search history.

(56) References Cited

U.S. PATENT DOCUMENTS

| | | | |
|---|---|---|---|
| 2010/0211685 A1 | 8/2010 | McDowall | |
| 2011/0292445 A1* | 12/2011 | Kato | G06F 3/1222 358/1.15 |
| 2011/0319016 A1 | 12/2011 | Gormley | |
| 2013/0215467 A1* | 8/2013 | Fein | G06F 3/1204 358/1.15 |
| 2013/0219303 A1 | 8/2013 | Eriksson | |

OTHER PUBLICATIONS

Mohamed Awad, Broadcom's NEC Technology Powers Brother's New Tap-to-Print Feature, B-Connected, Jul. 11, 2013.
Samsung, Samsung NFC-Enabled Color Laser Printers Available in Stores Next Week, Samsung U.S. News Center, Jul. 24, 2013.
Karl Dyer, Samsung launches laser printers with NFC, NFC World, Jun. 26, 2013.
M. David Stone, HP 1200w NFC/Wireless Mobile Print Accessory, PCMAG, Aug. 12, 2014.
HP NFC/Wireless 1200w Mobile Print Accessory Data Sheet, HP, Aug. 2013.
Rod Trent, IT Guide to Windows 8.1: NFC Printing, WindowsITPro.com, Jul. 24, 2013.
HP, Practical considerations for imaging and printing security, Sep. 2003.
HP, NFC/Wireless 1200w Mobile Print Accessory Manual, Oct. 2013.
Ricoh, Ricoh HotSpot Multifunction Printer, 2010. Andreas Kukla et al., Concept of Mobile Printing Application, Canon Austria GmbH, Nov. 2009.
Breezy, Easy mobile printing for everyone, Mar. 2011.
Ricoh, Print from your BlackBerry smartphone, 2010.
Holly Muscolino, The Mobile Business Printing Landscape: Assessing the Opportunity, Industry Developments and Models, May 2011.
Xerox, Xerox Mobile Print Solution, 2010.

* cited by examiner

*Primary Examiner* — Saeid Ebrahimi Dehkordy
(74) *Attorney, Agent, or Firm* — Canon U.S.A., Inc. IP Division

(57) ABSTRACT

Systems, devices, and methods for communicating with an image-forming device obtain a tap event that was generated in response to receiving a message from an image-forming device through a communication channel, extract an image-forming-device identifier from the tap event, listen for a device-added event, obtain a device-added event that was generated in response to successfully configuring a computing device to communicate with a newly-added device, extract a newly-added-device identifier from the device-added event, determine that the image-forming device is identical to the newly-added device based on the image-forming-device identifier and on the newly-added-device identifier, and send an image-forming-operation request to the image-forming device in response to determining that the image-forming device is identical to the newly-added device.

15 Claims, 7 Drawing Sheets

DEVICES, SYSTEMS, AND METHODS FOR COMMUNICATING WITH AN IMAGE-FORMING DEVICE

BACKGROUND

1. Technical Field

This description generally relates to devices, systems, and methods for communicating with image-forming devices.

2. Background

Users often use image-forming devices to print text, graphics, photos, and other print jobs. To establish communications with an image-forming device, some systems implement device discovery, driver management, and universal plug-and-play. These systems discover devices on their local network. After receiving a selection of a discovered device, these systems obtain information about the selected device and search for a printer driver for the selected device, if an appropriate printer driver is not already installed. If a matching printer driver is found, these systems install the driver, create a print queue, and set the correct port. However, these systems may not work well for devices that do not operate in a typical desktop system.

SUMMARY

In one embodiment, a method comprises obtaining a tap event that was generated in response to receiving a message from an image-forming device through a communication channel, extracting an image-forming-device identifier from the tap event, listening for a device-added event, obtaining a device-added event that was generated in response to successfully configuring a computing device to communicate with a newly-added device, extracting a newly-added-device identifier from the device-added event, determining that the image-forming device is identical to the newly-added device based on the image-forming-device identifier and on the newly-added-device identifier, and sending an image-forming-operation request to the image-forming device in response to determining that the image-forming device is identical to the newly-added device.

In one embodiment, a device comprises a computer-readable medium and one or more processors that are coupled to the computer-readable medium and that are configured to cause the device to obtain a tap event that was generated in response to receiving a message from an image-forming device, extract an image-forming-device identifier from the tap event, obtain a device-added event that was generated in response to successfully configuring the device to communicate with a newly-added device, extract a newly-added-device identifier from the device-added event, determine that the image-forming device is identical to the newly-added device based on the newly-added-device identifier and on the image-forming-device identifier, and send an image-forming-operation request to the image-forming device in response to determining that the image-forming device is identical to the newly-added device.

In one embodiment, one or more computer-readable media store computer-executable instructions that, when executed by one or more computing devices, cause the computing devices to perform operations that comprise obtaining a tap event that was generated in response to receiving a message from an image-forming device, extracting an image-forming-device identifier from the tap event, listening for a device-added event, obtaining a device-added event that was generated in response to successfully configuring the one or more computing devices to communicate with a newly-added device, extracting a newly-added-device identifier from the device-added event, determining that the image-forming device is identical to the newly-added device based on the image-forming-device identifier and on the newly-added-device identifier, and sending an image-forming operation request to the image-forming device in response to determining that the image-forming device is identical to the newly-added device.

DESCRIPTION

The following disclosure describes certain explanatory embodiments. Other embodiments may include alternatives, equivalents, and modifications. Additionally, the explanatory embodiments may include several novel features, and a particular feature may not be essential to some embodiments of the devices, systems, and methods that are described herein.

Figure 1:
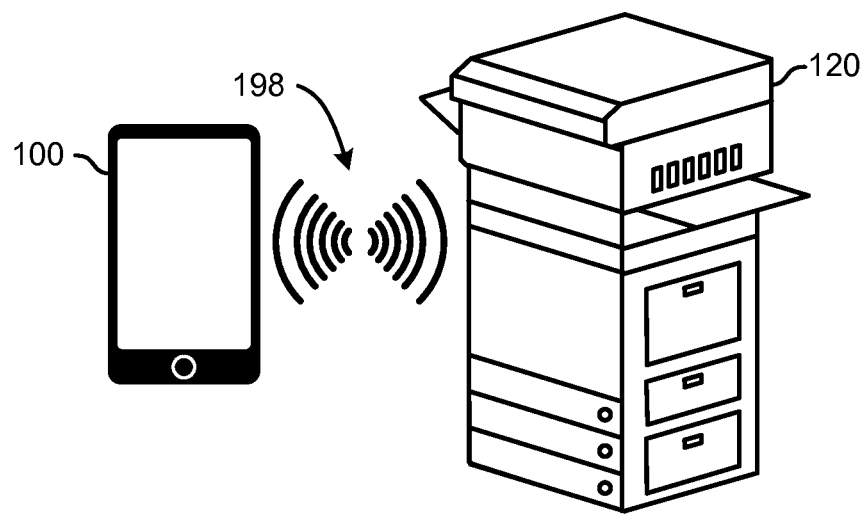
FIG. 1 illustrates an example embodiment of a system for communicating with an image-forming device.

FIG. 1 illustrates an example embodiment of a system for communicating with an image-forming device. The system includes a user device 100 and an image-forming device 120, which communicate with each other by means of one or more wireless channels 198 (e.g., near-field communication, 802.11, Bluetooth).

Following is a description of a user's perception of an example embodiment of the system in operation. This example uses a request to print a screen shot, and, in this example, the request to print does not identify an image-forming device. First, a user inputs a request to print the screen shot into a user interface of the user device 100. Next, the user brings the user device 100 into close enough proximity to engage in near-field communication with the image-forming device 120, which is also referred to herein as "tapping" the image-forming device 120. Finally, the image-forming device 120 prints the screen shot. Accordingly, the user may select the image-forming device 120 by tapping the image-forming device 120 with the user device 100, rather than by selecting the image-forming device 120 by means of a user interface that is displayed by the user device 100.

Following is a description of a user's perception of another example embodiment of the system in operation. This example uses a request to scan a document, and, in this example, the request to scan does not identify an image-forming device. First, a user loads a document that the user wants to scan into the image-forming device 120. Next, the user inputs a request to scan into a user interface of the user device 100. The request to scan may identify a storage location of the scan job. Then the user brings the user device 100 into close enough proximity to engage in near-field communication with the image-forming device 120. Finally, the image-forming device 120 scans the document and sends the scan job to the user device 100. Like the previous example embodiment, the user may select the image-forming device 120 by tapping the image-forming device 120 with the user device 100, rather than by selecting the image-forming device 120 by means of a user interface that is displayed by the user device 100.

Figure 2:
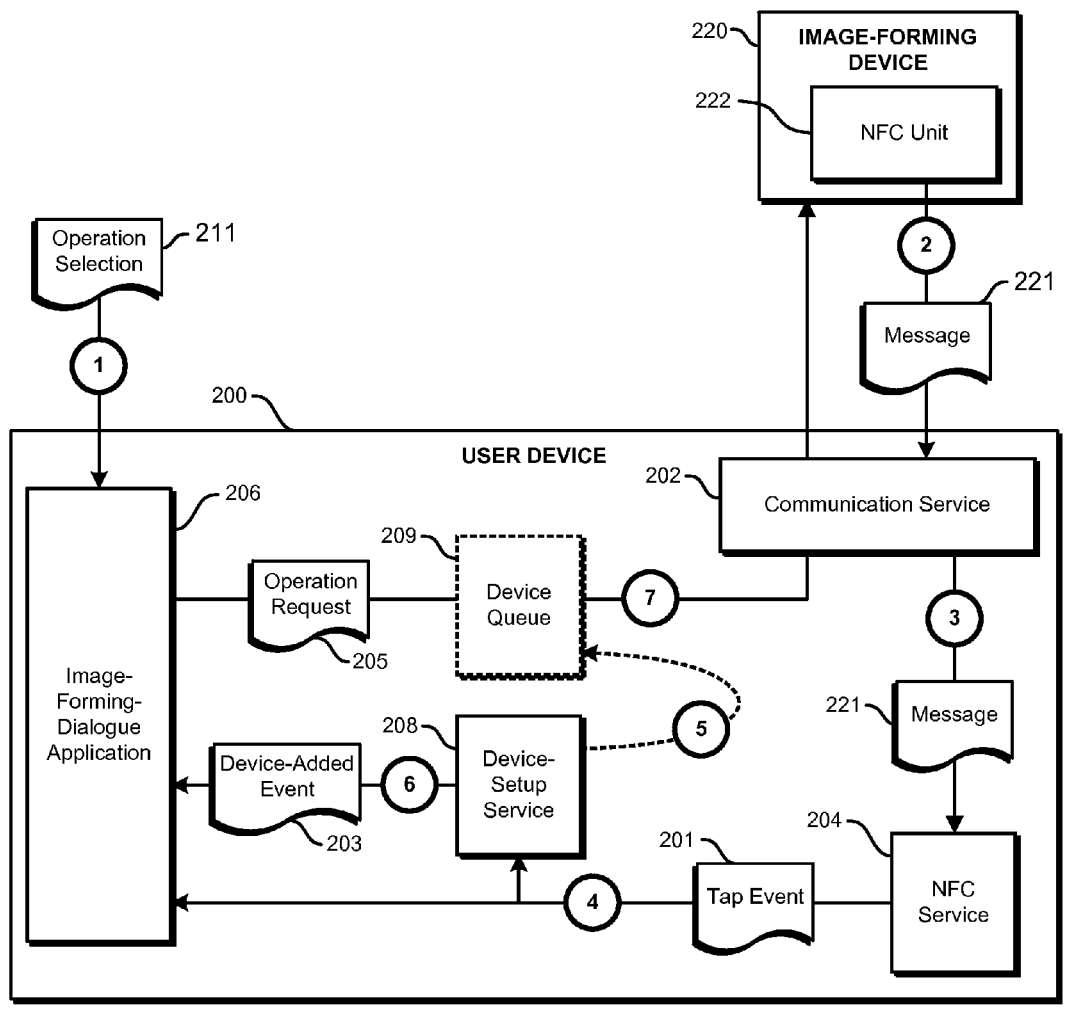
FIG. 2 illustrates an example embodiment of a system for communicating with an image-forming device and the flow of operations in the system.

FIG. 2 illustrates an example embodiment of a system for communicating with an image-forming device and the flow of operations in the system. The system includes an image-forming device 220, which includes an NFC unit 222, and the system includes a user device 200, which includes a communication service 202, an NFC service 204, a device-setup service 208, and an image-forming-dialogue application 206. Also, some embodiments of the user device 200 include a device queue 209 or a device driver.

The image-forming device 220 has wireless-communication capabilities and one or more image-forming capabilities. Image-forming capabilities include, for example, additive-manufacturing capabilities (e.g., inkjet printing, laser printing, three-dimensional printing), subtractive-manufacturing capabilities, and scanning capabilities. The image-forming device 220 may be capable of driverless operation or may include its own driver.

The NFC unit 222 includes hardware (e.g., circuitry) and, in some embodiments, software, and the NFC unit 222 is configured to communicate with other devices (e.g., the user device 200) by means of near-field communication. For example, the NFC unit 222 may be an unpowered tag, which is a passive target. Also for example, the NFC unit 222 may include a powered near-field-communication transmitter and receiver that may have a passive communication mode, may have an active communication mode, and may allow peer-to-peer communication.

The user device 200 is a computing device (e.g., a smart phone, a tablet computer, a laptop computer, a personal digital assistant) that has wireless-communication capabilities. The user device 200 operates an image-forming-dialogue application 206 (also referred to herein as an "IFD application"), which is an application (e.g., photo viewer, text editor, photo editor, web browser, computer-aided-design program) that allows a user to enter a request for an image-forming operation (e.g., printing, scanning). The request may identify data (e.g., a file, an image, a screen shot) that are to be sent to the image-forming device 220 or may identify a storage location that is to be used to store data (e.g., a scan job) that are received from the image-forming device 220.

The user device 200 also operates a communication service 202, which controls communications with other devices, and operates an NFC service 204, which listens for messages 221 and which generates and sends tap events 201 to the applications that are listening for tap events 201. Additionally, the user device 200 operates a device-setup service 208, which receives and identifies requests to add new devices, configures the user device 200 to communicate with new devices, and generates device-added events 203. One or more of the device-setup service 208, the communication service 202, and the NFC service 204 may be implemented by an operating system of the user device 200.

In stage 1, the image-forming-dialogue application 206 receives an image-forming-operation selection 211, for example by means of a user interface that is presented on a touchscreen display of the user device 200. In some embodiments, the image-forming operation is a scan job or a print job. Also, the image-forming-operation selection 211 may not identify an image-forming device. Therefore, in some embodiments, the user device 200 (e.g., the image-forming-dialogue application 206 on the user device 200) determines the image-forming device that will perform the image-forming operation that is identified by the image-forming-operation selection 211 after receiving the image-forming-operation selection 211.

In stage 2, the user device 200 is brought close enough to communicate with the NFC unit 222 of the image-forming device 220 by means of near-field communication (for example by physically touching a certain location on the image-forming device 220 with the user device 200), and the NFC unit 222 of the image-forming device 220 sends a message 221, which identifies the image-forming device 220, to the user device 200. The message 221 may include other information, for example information that the user device 200 can use to establish another channel of communication (e.g., by means of 801.11, by means of Bluetooth) with the image-forming device 220. In stage 3, the communication service 202 sends the message 221 to the NFC service 204.

In stage 4, the NFC service 204 generates a tap event 201 based on the message 221, and then the NFC service 204 sends the tap event 201 to the image-forming-dialogue application 206 and to the device-setup service 208. The tap event 201 includes some of or all of the contents of the message 221, for example an identifier (e.g., serial number) of the image-forming device 220. The image-forming-dialogue application 206 determines the identity of the image-forming device 220 based on the tap event 201, and the image-forming-dialogue application 206 listens for a device-added event 203.

Also, in stage 5, the device-setup service 208 uses the contents of the tap event 201 to configure the user device 200 to send image-forming jobs (e.g., print jobs) to the image-forming device 220 or to receive image-forming jobs (e.g., scan jobs) from the image-forming device 220. The device-setup service 208 may extract some device-identifying information, such as a device ID and a network IP address, from the tap event 201. In some embodiments, the device-setup service 208 initiates the establishment of another channel of communication with the image-forming device 220 based on the tap event 201. For example, the tap event 201 may include the information that the user device 200 can use to establish a Wi-Fi direct connection with the image-forming device 220, and the device-setup service 208 may initiate the establishment of the Wi-Fi direct connection. Additionally, in stage 5 of some embodiments, the user device 200 creates a device queue 209 or installs a device driver for the image-forming apparatus 220. Also, the tap event 201 (and the message 221) may include a command for the user device 200 to install the device queue 209 or the device driver.

In stage 6, the device-setup service 208 generates a device-added event 203 in response to completing the configuration of the user device 200 to send image-forming jobs to the image-forming device 220 or to receive image-forming jobs from the image-forming device 220. The device-added event 203 identifies the newly-added device, which, in this example, is the image-forming device 220. The image-forming-dialogue application 206, which is listening for device-added events 203, obtains the device-added event 203. The image-forming-dialogue application 206 compares the device that is identified by the device-added event 203 with the device that is identified by the tap event 201.

Finally, in stage 7, if the device-added event 203 and the tap event 201 identify the same device, then the image-forming-dialogue application 206 sends an image-forming operation request 205 (e.g., a print job, a scan job) to the image-forming device 220, and the image-forming-dialogue application 206 may also send associated data (e.g., print-job data, scan-job data) to the image-forming device 220. In some embodiments, the image-forming-dialogue application 206 sends the operation request 205 to a device queue 209 or a device driver, which then sends the operation request 205 to the image-forming device 220 by means of the communication service 202. In some embodiments (e.g., in systems that implement driverless printing), the image-forming-dialogue application 206 sends the operation request 205 to the image-forming device 220 without sending the operation request to a device queue 209 or a device driver.

Figure 3:
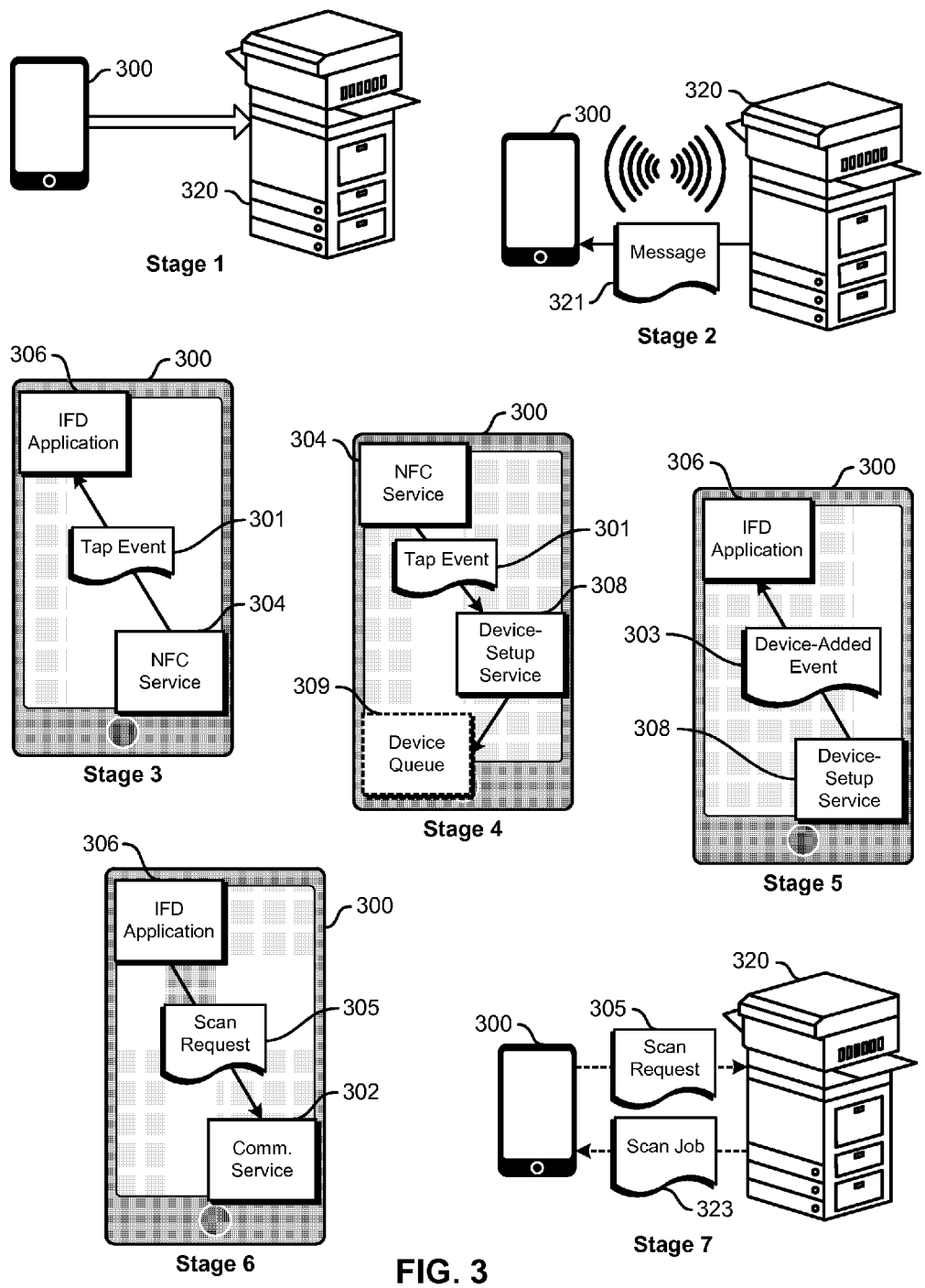
FIG. 3 illustrates example embodiments of the operations that are performed by a system for communicating with an image-forming device.

FIG. 3 illustrates example embodiments of the operations that are performed by a system for communicating with an image-forming device. After an image-forming-dialogue application 306 of a user device 300 has obtained an image-forming-operation selection, which is a scan command in this example, then in stage 1 the user device 300 is brought into close enough proximity with an NFC unit of an image-forming device 320 to communicate by means of near-field communication. In stage 2, the NFC unit of the image-forming device 320 sends the message 321 to the user device 300.

Then in stage 3, the NFC service 304 obtains the message 321 and generates a tap event 301 based on the message 321, and the image-forming-dialogue application 306 obtains the tap event 301. Next, in stage 4, the device-setup service 308 obtains the tap event 301 from the NFC service 304, and the device-setup service 308 configures the user device 300 to further communicate with the image-forming device 320. In some embodiments, the device-setup service 308 installs a device queue 309 or a device driver for the image-forming device 320.

Next, in stage 5, the device-setup service 308 generates a device-added event 303, which is obtained by the image-forming-dialogue application 306. In stage 6, in response to determining that the device that is identified by the device-added event 303 is identical to the device that is identified by the tap event 301, the image-forming-dialogue application 306 sends a scan request 305 to the communication service 302. In some embodiments, the image-forming-dialogue application 306 sends the scan request to the device queue 309 or the device driver, which then sends the scan request to the communication service 302. In stage 7, the communication service 302 sends the scan request 305 to the image-forming device 320, and the image-forming device 320 performs the scan operation and sends the scan job 323 to the communication service 302.

Figure 4:
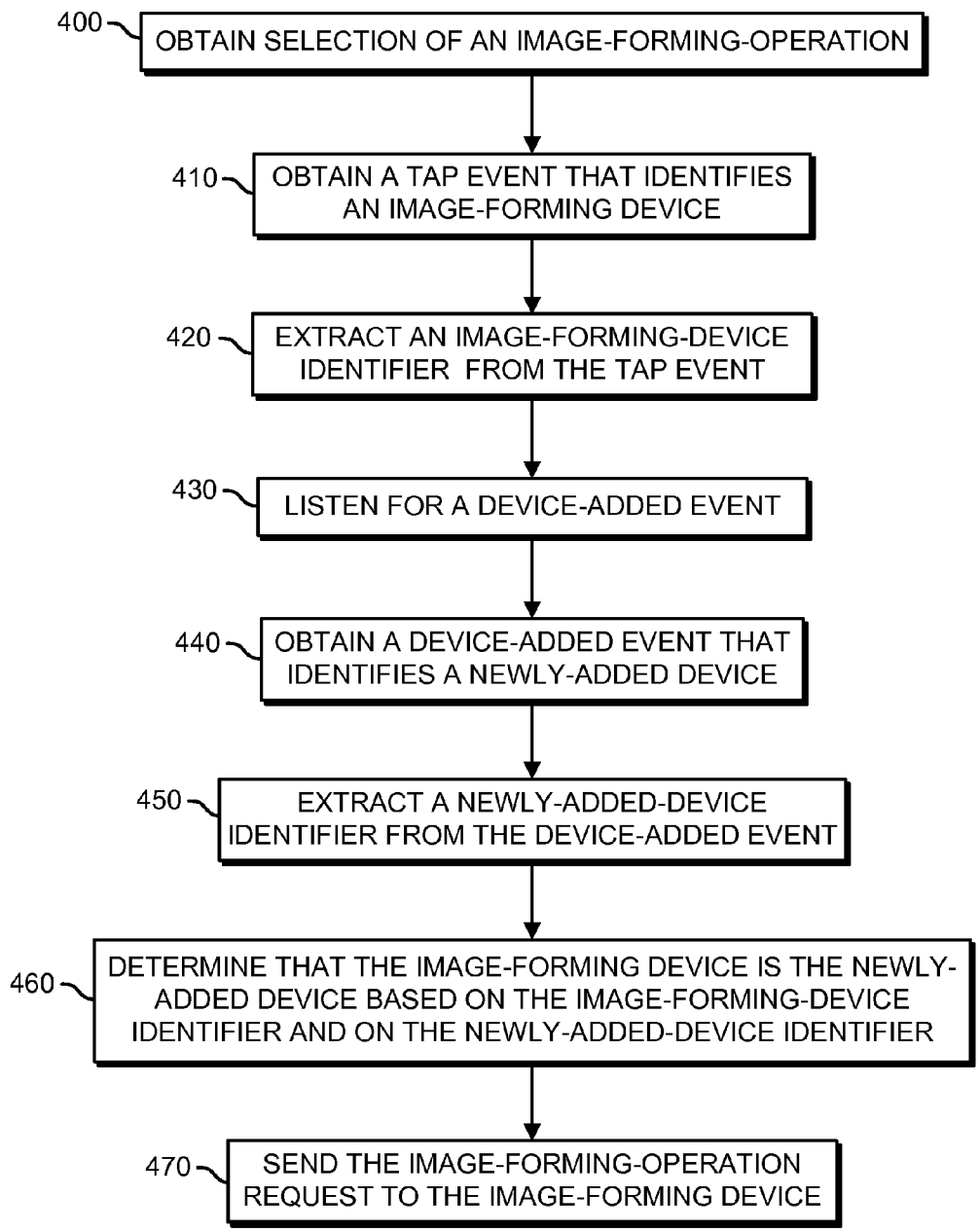
FIG. 4 illustrates an example embodiment an operational flow for communicating with an image-forming device.

FIG. 4 illustrates an example embodiment an operational flow for communicating with an image-forming device. The blocks of this operational flow and the other operational flows that are described herein may be performed by one or more computing devices, for example the computing devices described herein. Also, although this operational flow and the other operational flows that are described herein are each presented in a certain order, some embodiments may perform at least some of the operations in different orders than the presented orders. Examples of possible different orderings include concurrent, overlapping, reordered, simultaneous, incremental, and interleaved orderings. Thus, other embodiments of this operational flow and the other operational flows that are described herein may omit blocks, add blocks, change the order of the blocks, combine blocks, or divide blocks into more blocks.

In some embodiments, the operations in FIG. 4 are performed by an image-forming-dialogue application that is implemented by a computing device. The flow starts in block 400, where a selection of an image-forming operation is obtained. The flow then moves to block 410, where a tap event (e.g., a tap event that was generated based on a message that was obtained from an NFC unit) that identifies an image-forming device is obtained. The flow proceeds to block 420, where an image-forming-device identifier 420 is extracted from the tap event. Next, in block 430, a device-added event is listened for. The flow then moves to block 440, where a device-added event that identifies a newly-added device is obtained. Then in block 450, a newly-added-device identifier is extracted from the device-added event.

The flow then proceeds to block 460, where it is determined that the image-forming device is the same device as the newly-added device based on the image-forming-device identifier and on the newly-added-device identifier. Finally, in block 470, an image-forming-operation request for the selected image-forming operation is sent to the image-forming device.

Additionally, some embodiments display a ready-to-print notification on a user interface of the user device before performing the operations in block 470, and the user interface allows a user to enter a command to proceed with the image-forming operation. Once a command to proceed is received, then the operations in block 470 are performed.

Figure 5:
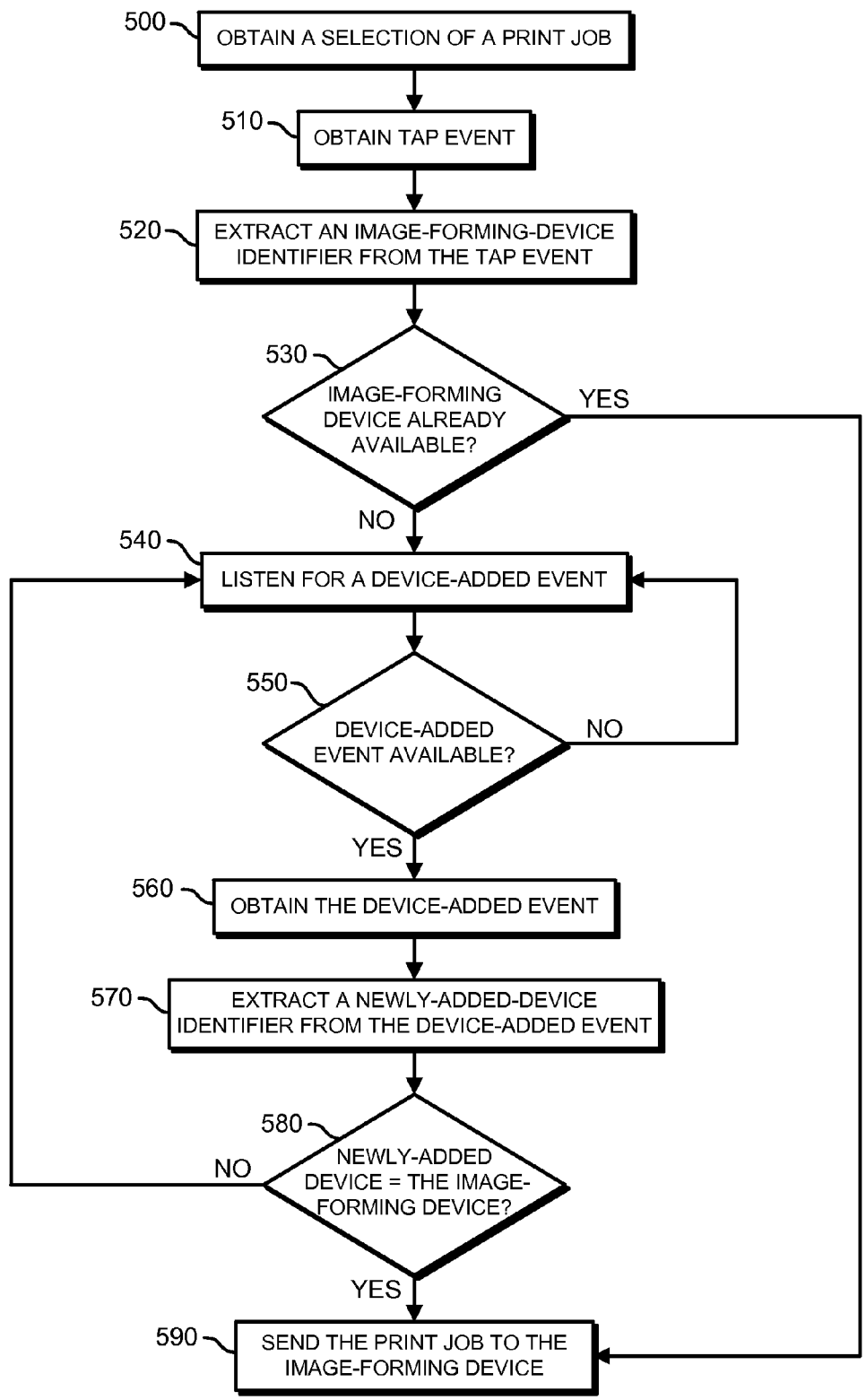
FIG. 5 illustrates an example embodiment an operational flow for communicating with an image-forming device.

FIG. 5 illustrates an example embodiment an operational flow for communicating with an image-forming device. In some embodiments, the operations in FIG. 5 are performed by an image-forming-dialogue application that is implemented by a computing device. The flow starts in block 500, where a selection of a print job is obtained. Next, in block 510, a tap event is obtained. The flow then proceeds to block 520, where an image-forming-device identifier is extracted from the tap event. The flow then moves to block 530, where it is determined if the image-forming device that is identified by the image-forming-device identifier is already available to perform the print job. If yes (block 530=yes), then the flow proceeds to block 590, where the print job is sent to the image-forming device. If not (block 530=no), then the flow moves to block 540.

In block 540, a device-added event is listened for. Next, in block 550, it is determined if a device-added event is available. If not (block 550=no), then the flow returns to block 540. If yes (block 550=yes), then the flow proceeds to block 560.

In block 560, the device-added event is obtained. Next, in block 570, a newly-added-device identifier is extracted from the device-added event. The flow then moves to block 580, where it is determined if the newly-added device is the image-forming device that was identified by the tap event, based on the image-forming-device identifier and on the newly-added-device identifier. If they are not the same (block 580=no), then the flow returns to block 540. If they are the same (block 580=yes), then the flow moves to block 590, where the print job is sent to the image-forming device.

Figure 6:
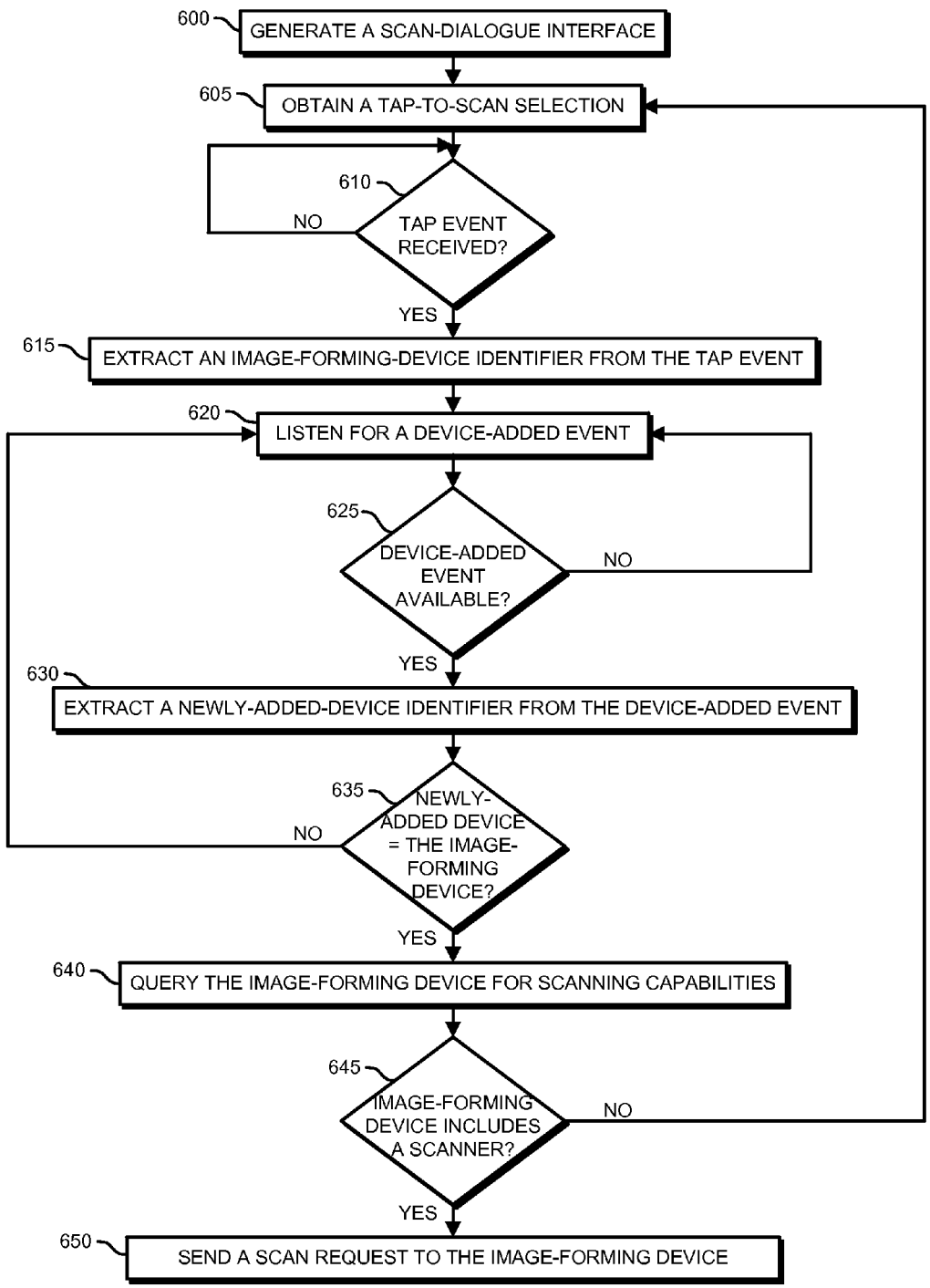
FIG. 6 illustrates an example embodiment an operational flow for communicating with an image-forming device.

FIG. 6 illustrates an example embodiment an operational flow for communicating with an image-forming device. In some embodiments, the operations in FIG. 6 are performed by an image-forming-dialogue application that is implemented by a computing device. The flow starts in block 600, where a scan-dialogue interface is generated. The scan-dialogue interface allows a user to select a tap-to-scan operation, and the scan-dialogue interface may also allow a user to select a storage location for the scan job. The flow then moves to block 605, where a tap-to-scan selection is obtained. Next, in block 610, it is determined if a tap event has been received. If not (block 610=no), then the flow continues to wait at block 610. If yes (block 610=yes), then the flow proceeds to block 615.

In block 615, an image-forming-device identifier is extracted from the tap event. Next, in block 620, a device-added event is listened for. The flow then moves to block 625, where it is determined if a device-added event is available. If not (block 625=no), then the flow returns to block 620. If yes (block 625=yes), then the flow moves to block 630. In block 630, a newly-added-device identifier is extracted from the device-added event. Next, in block 635, it is determined if the newly-added device that is identified by the device-added event is identical to the image-forming device that is identified by the tap event, based on the newly-added-device identifier and the image-forming-device identifier. If they are not identical (block 635=no), then the flow returns to block 620. If they are identical, then the flow moves to block 640.

In block 640, the image-forming device is queried for scanning capabilities. Then in block 645, whether the image-forming device includes a scanner is determined. If the image-forming device does not include a scanner (block 645=no), then the flow returns to block 605. If the image-forming device does include a scanner (block 645=yes), then the flow proceeds to block 650. Finally, in block 650, a scan request, which is an example of an image-forming operation request, is sent to the image-forming device. Other information (e.g., a storage location and scanner configuration information) may also be sent to the image-forming device with the scan request.

Figure 7:
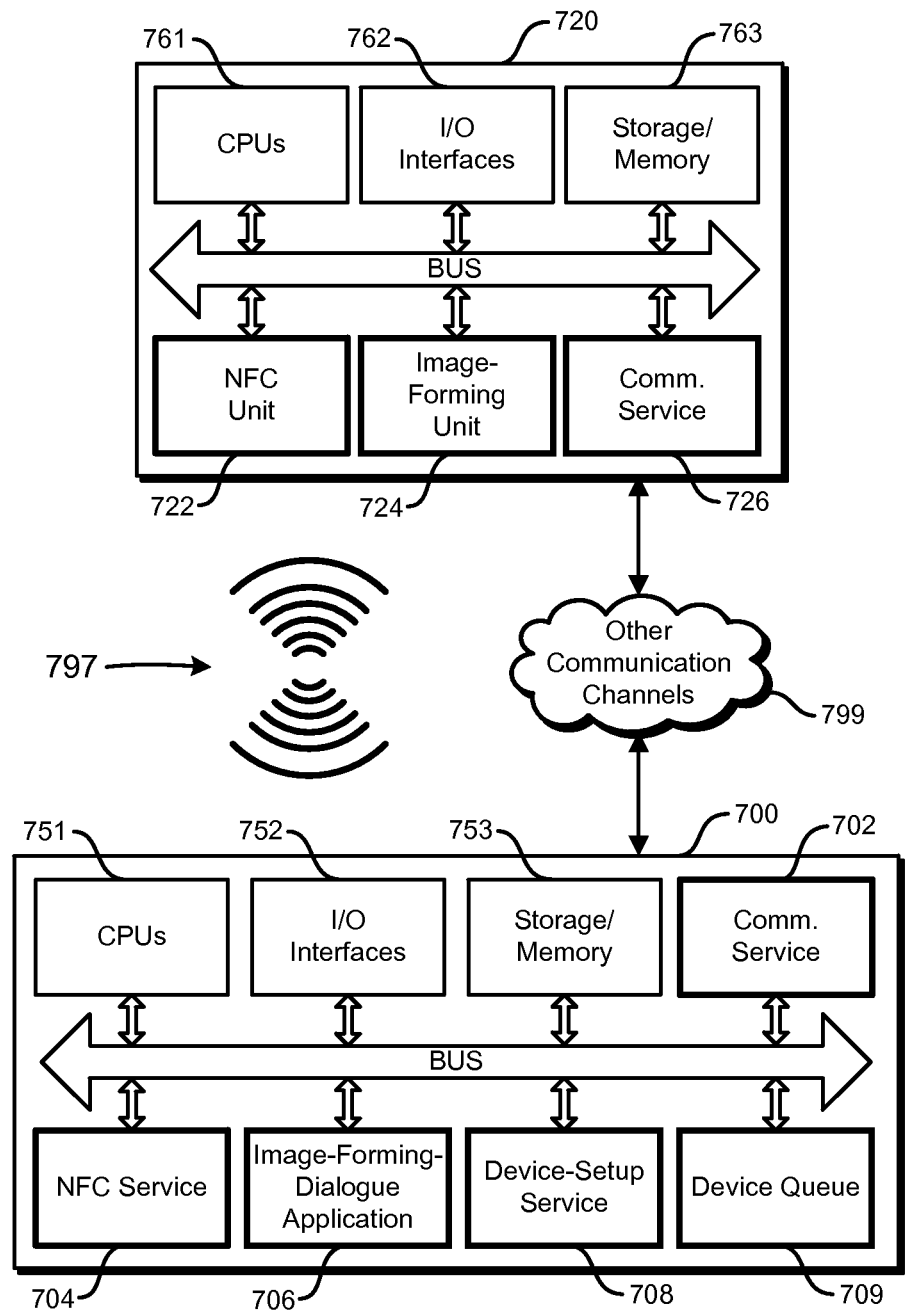
FIG. 7 illustrates an example embodiment of a system for communicating with an image-forming device.

FIG. 7 illustrates an example embodiment of a system for communicating with an image-forming device. The system includes a user device 700 and an image-forming device 720. The user device 700 and the image-forming device 720 communicate by means of an NFC channel 797 and by means of one or more other communication channels 799, which may include one or more of the following: a wireless network that has a wireless access point, a direct wireless connection (e.g., Wi-Fi direct, Bluetooth), and a wired network.

The user device 700 includes one or more processors (CPUs) 751, one or more I/O interfaces 752, and storage/memory 753. The CPUs 751 include one or more central processing units, which include microprocessors (e.g., a single core microprocessor, a multi-core microprocessor) or other circuits, and the CPUs 751 are configured to read and perform computer-executable instructions, such as instructions in storage, in memory, or in a module. The I/O interfaces 752 include communication interfaces to input devices and output devices, which may include a keyboard, a display, a mouse, a printing device, a touch screen, a light pen, an optical-storage device, a scanner, a microphone, a camera, a drive, a controller, and a network (either wired or wireless).

The storage/memory 753 includes one or more computer-readable or computer-writable media, for example a computer-readable storage medium. A computer-readable storage medium, in contrast to a mere transitory, propagating signal, includes a tangible article of manufacture, for example a magnetic disk (e.g., a floppy disk, a hard disk), an optical disc (e.g., a CD, a DVD, a Blu-ray), a magneto-optical disk, magnetic tape, and semiconductor memory (e.g., a non-volatile memory card, flash memory, a solid-state drive, SRAM, DRAM, EPROM, EEPROM). The storage/memory 753 can store computer-readable data or computer-executable instructions. The components of the user device 700 communicate via a bus.

The user device 700 also includes a communication service 702, an NFC service 704, an image-forming-dialogue application 706, a device-setup service 708, and a device queue 709. The communication service 702, the NFC service 704, the device-setup service 708, and the image-forming-dialogue application 706 may be implemented in software (e.g., Assembly, C, C++, C#, Java, BASIC, Perl, Visual Basic), hardware (e.g., customized circuitry), or a combination of software and hardware. Additionally, an operating system on the user device 700 may implement part of or all of the communication service 702, part of or all of the NFC service 704, and part of or all of the device-setup service 708.

The communication service 702 includes computer-executable instructions that, when executed by the user device 700, cause the user device 700 to perform one or more of the following: obtain a message from the NFC unit 722, send an image-forming-operation request to the image-forming device 720, send other data to the image-forming device 720, and receive other data from the image-forming device 720.

The NFC service 704 includes computer-executable instructions that, when executed by the user device 700, cause the user device 700 to listen for messages that were received from the NFC unit 722 and generate tap events based on received messages.

The image-forming-dialogue application 706 includes computer-executable instructions that, when executed by the user device 700, cause the user device 700 to receive an image-forming-operation selection, listen for tap event, listen for device-added events, determine if a device that is identified by a tap event is the same device as a device that is identified by a device-added event, and initiate the sending of image-forming-operation requests to the image-forming device 720.

The device-setup service 708 includes computer-executable instructions that, when executed by the user device 700, cause the user device 700 to listen for tap events, configure the user device 700 to communicate with devices that are identified by tap events, and generate device-added events.

The image-forming device 720 includes one or more processors (CPUs) 761, one or more I/O interfaces 762, storage/memory 763, an NFC unit 722, an image-forming unit 724, and a communication service 726. The image-forming unit 724 includes hardware and software that are configured to cause the image-forming device 720 to perform one or more image-forming operations (e.g., laser printing, inkjet printing, three-dimensional printing, image scanning, and a computer-numerical-control milling operation). Also, the communication service 726 includes hardware and software that are configured to cause the image-forming device 720 to communicate with other devices by means of the NFC unit 722 and the I/O interfaces 762.

The above-described devices and systems can be implemented, at least in part, by providing one or more computer-readable media that contain computer-executable instructions for realizing the above-described operations to one or more computing devices that are configured to read and execute the computer-executable instructions. The systems or devices perform the operations of the above-described embodiments when executing the computer-executable instructions. Also, an operating system on the one or more systems or devices may implement at least some of the operations of the above-described embodiments.

Any applicable computer-readable medium (e.g., a magnetic disk (including a floppy disk, a hard disk), an optical disc (including a CD, a DVD, a Blu-ray disc), a magneto-optical disk, a magnetic tape, and semiconductor memory (including flash memory, DRAM, SRAM, a solid state drive, EPROM, EEPROM)) can be employed as a computer-readable medium for the computer-executable instructions. The computer-executable instructions may be stored on a computer-readable storage medium that is provided on a function-extension board inserted into a device or on a function-extension unit connected to the device, and a CPU provided on the function-extension board or unit may implement at least some of the operations of the above-described embodiments.

The scope of the claims is not limited to the above-described embodiments and includes various modifications and equivalent arrangements. Also, as used herein, the conjunction "or" generally refers to an inclusive "or," though "or" may refer to an exclusive "or" if expressly indicated or if the context indicates that the "or" must be an exclusive "or."

What is claimed is:

1. A method comprising:
obtaining, at a computing device, a tap event that was generated in response to receiving a message from an image-forming device through a first communication channel;
extracting an image-forming-device identifier of the image-forming device from the tap event;
obtaining a device-added event that was generated in response to successfully configuring the computing device to communicate with a newly-added device through a second communication channel;
extracting a newly-added-device identifier from the device-added event;
comparing the image-forming-device identifier to the newly-added-device identifier to determine if the image-forming device is identical to the newly-added device; and
sending an image-forming-operation request to the image-forming device in response to determining that the image-forming device is identical to the newly-added device.

2. The method of claim 1, wherein the first communication channel is a near-field-communication channel.

3. The method of claim 1, further comprising:
generating an interface in response to obtaining the tap event, wherein the interface includes a message that indicates that a device is being installed.

4. The method of claim 1, wherein an operating system generates one or more of the tap event and the device-added event.

5. The method of claim 4, wherein the operating system generates both the tap event and the device-added event.

6. The method of claim 1, wherein the image-forming operation that is identified by the image-forming-operation request is a print job or a scan job.

7. A device comprising:
a computer-readable medium; and
one or more processors that are coupled to the computer-readable medium and that are configured to cause the device to
obtain a tap event that was generated in response to receiving a message from an image-forming device through a first communication channel,
extract an image-forming-device identifier from the tap event,
obtain a device-added event that was generated in response to successfully configuring the device to communicate with a newly-added device through a second communication channel,
extract a newly-added-device identifier from the device-added event,
comparing the image-forming-device identifier to the newly-added-device identifier to determine if the image-forming device is identical to the newly-added device, and
send an image-forming-operation request to the image-forming device in response to determining that the image-forming device is identical to the newly-added device.

8. The device of claim 7, wherein the one or more processors are further configured to cause the device to send a query to the image-forming device, wherein the query includes a request for the image-forming device to return an indicator of scanning capabilities of the image-forming device.

9. The device of claim 7, wherein the one or more processors are further configured to cause the device to generate an operation-confirmation display, wherein the operation-conformation display is configured to accept a command to proceed with the image-forming operation, and
wherein the one or more processors are further configured to cause the device to send the image-forming-operation request to the image-forming device in response to receiving the command to proceed and in response to determining that the image-forming device is identical to the newly-added device.

10. One or more computer-readable storage media storing computer-executable instructions that, when executed by one or more computing devices, cause the one or more computing devices to perform operations comprising:
obtaining a tap event that was generated in response to receiving a message from an image-forming device through a first communication channel;
extracting an image-forming-device identifier from the tap event;
obtaining a device-added event that was generated in response to successfully configuring the one or more computing devices to communicate with a newly-added device through a second communication channel;
extracting a newly-added-device identifier from the device-added event;
comparing the image-forming-device identifier to the newly-added-device identifier to determine if the image-forming device is identical to the newly-added device; and
sending an image-forming operation request to the image-forming device in response to determining that the image-forming device is identical to the newly-added device.

11. The one or more computer-readable storage media of claim 10, wherein the operations further comprise sending an indicator of a storage location to the image-forming device with the image-forming operation request.

12. The one or more computer-readable storage media of claim 10, wherein the first communication channel is a near-field-communication channel.

13. The one or more computer-readable storage media of claim 10, wherein configuring the one or more computing devices to communicate with the newly-added device includes installing a driver for the newly-added device.

14. The one or more computer-readable storage media of claim 10, wherein the operations further comprise generating an operation-confirmation display, wherein the operation-conformation display is configured to accept a command to proceed with the image-forming operation; and
receiving the command to proceed with the image-forming operation,
wherein the image-forming operation request is sent to the image-forming device in response to receiving the command to proceed and in response to determining that the image-forming device is identical to the newly-added device.

15. The one or more computer-readable storage media of claim 10, wherein configuring the one or more computing devices to communicate with the newly-added device includes installing a device queue for the newly-added device.

* * * * *